United States Patent
Hanchett et al.

(10) Patent No.: US 7,181,856 B1
(45) Date of Patent: Feb. 27, 2007

(54) LASER MEASUREMENT SYSTEM

(76) Inventors: Michael T. Hanchett, 20908 Woodlake Dr., Edmonds, WA (US) 98026; Darryl W. Koop, 21318 Pioneer Way, Edmonds, WA (US) 98026; Roy E. Lawton, 7520 Second Ave., NE., Seattle, WA (US) 98115; Jim C. Hartl, P.O. Box 918, Snohomish, WA (US) 98291; Robin L. Knoke, P.O. Box 1639, 688 Hwy. 14, White Salmon, WA (US) 98672

( * ) Notice: Subject to any disclaimer, the term of this patent is extended or adjusted under 35 U.S.C. 154(b) by 0 days.

(21) Appl. No.: 11/269,924

(22) Filed: Nov. 9, 2005

(51) Int. Cl.
*G01C 5/00* (2006.01)

(52) U.S. Cl. .................... 33/288; 33/DIG. 21

(58) Field of Classification Search .......... 33/286, 33/288, 290, 293, 294, 600, 613, 645, DIG. 21; 356/138, 153, 152.1
See application file for complete search history.

(56) References Cited

U.S. PATENT DOCUMENTS

| | | | | |
|---|---|---|---|---|
| 4,015,338 A | * | 4/1977 | Kunze et al. | 33/228 |
| 4,416,065 A | * | 11/1983 | Hunter | 33/288 |
| 4,889,425 A | * | 12/1989 | Edwards et al. | 356/153 |
| 5,029,397 A | * | 7/1991 | Palombi | 33/288 |
| 5,251,013 A | * | 10/1993 | Danielson et al. | 33/288 |
| 5,274,433 A | * | 12/1993 | Madey et al. | 33/288 |
| 5,671,160 A | * | 9/1997 | Julian | 33/293 |
| 6,148,528 A | * | 11/2000 | Jackson | 33/288 |
| 6,424,411 B1 | * | 7/2002 | Rapidel et al. | 33/288 |
| 6,775,639 B1 | * | 8/2004 | Mason | 33/288 |
| 2005/0126021 A1 | * | 6/2005 | Robb et al. | 33/288 |

* cited by examiner

*Primary Examiner*—G. Bradley Bennett
(74) *Attorney, Agent, or Firm*—Eric R. Katz

(57) ABSTRACT

A laser measurement system indicates the difference between an actual position of a vehicle frame reference point on a vehicle frame and a normal position employing a rotating laser scanner; an electro-optical detector and a host computer. A positioning arrangement is also provided for positioning the electro-optical detector at a known distance from the reference point. In operation, the host computer queries the scanner and detector via a communication link, calculates the actual position of the reference point, and displays the difference between the position of the vehicle reference point on the vehicle frame and the normal position.

20 Claims, 5 Drawing Sheets

LASER MEASUREMENT SYSTEM

BACKGROUND OF THE INVENTION

1. Field of the Invention

This invention generally relates a laser measurement system for determining the location of active targets in three-dimensional space, and more particularly to a laser measurement system for determining deformation in vehicle bodies for automobile collision repair using a laser scanning apparatus in conjunction with a plurality of active targets suspended from known reference points on the vehicle to calculate three dimensional spatial coordinates defining the actual positions of the active targets which is then compared with manufacturer-provided specification values to determine the extent of deformation of the vehicle body.

2. Background of the Invention

Vehicle frame deformation measurement systems, such as disclosed by U.S. Pat. Nos. 4,997,283, 5,251,013 and 5,801,834, use a pair of rotating laser light beams emitted from a laser measuring unit, however, these measurement systems scan passive reflective targets that have strips of reflective and non-reflective material to create a pulsed beam of reflected laser light. In these known systems, the pulses of reflected laser light from the passive targets are sensed and counted by the laser measuring unit. The resulting count is then used by a computer to calculate the position of the targets, compare it to a reference data base and then calculate the deformation of the vehicle frame. More particularly, the laser measuring unit comprises a helium-neon laser that emits a laser beam which is split into two laser beams by a 50/50 beam splitter, each beam then being directed to a rotating mirror. The rotating mirrors direct the laser beams in a 360 degree circle, with both beams being directed in a single plane. The beams sweep across the surfaces of the reflective targets attached to the reference holes on the vehicle.

In the Inventions of the above-noted patents, the reflective targets are passive devices that do not detect the laser light nor do they interact electronically with the laser measuring unit, but rather merely reflect the laser light signal. Each coded target contains strips of reflective and non-reflective material, the reflective strips reflecting the scanning laser beam back to its source as a series of pulses of light. These reflected pulses are registered as "on" events (or counts) by the electronics on board the laser measuring unit. A counter counts the number of counts (as measured by an oscillator) from zero to the edge of each reflective, non-reflective border.

A computer receives the count information for each target and computes the angle from the center of each mirror to the center of each target. With the two angle measurements (one for each mirror and target), and the known baseline between the two mirrors, the planar (X,Y) coordinates of each reference hole are computed using trigonometry. The third coordinate (Z coordinate) is calculated using Z coordinate-representative sizing of the reflective and non-reflective stripes on the coded targets.

The scanning arrangement used in the above arrangement is complicated, requiring the use of rotating mirrors to create two laser beam sources each rotating around their respective points of origin. In addition, the targets themselves do provide indications to the repair technician indicating which way and how far a particular target is out of alignment as compared to the reference points.

SUMMARY OF THE INVENTION

Accordingly, it is an object of the present invention is to provide a laser measurement system for use in automotive collision repairs which employs a relatively simple laser scanner arrangement for scanning active targets that provide information used by a Host Computer to generate a local display of the extent of deformation of a vehicle frame.

Another object of the present invention is to provide a laser measurement system employing active targets that have light indicators used by the repair technician in real-time as a guide for indicating the direction and extent of movement of the active target necessary to make the needed repairs to the vehicle frame.

Yet another object of the present invention is to provide a laser measurement system for use in automotive collision repairs which allows the user to observe the vehicle frame's deformed state by changing the color on the graphic of the frame to represent the damage and showing a displaced point relative to the measured points.

Still another object of the present invention is to provide a laser measurement system for vehicle repairs that permits the repair technician to observe the vehicle frame in real-time as the frame is being repaired.

Yet another object of the present invention is to provide a laser measurement system of vehicle frame repair that employs frame repair software that provides a quality user interface, mathematical analysis and information display as well as the ability to graphically and numerically report the results of the repair analysis for insurance purposes and the like.

One advantageous feature of the present invention is that the system is capable of saving customer data, automobile data, insurance company data, and repair technician data in a database of repair information that stores all of the information regarding each individual measurement and repair done by a given workstation for a given customer. The data is stored in such a format that it can be transferred to other workstations, and archived for later retrieval. The data is also accessible by the other screens for uses appropriate to each screen.

Yet another advantageous feature of the laser measurement system of the present invention is that it compares the undamaged or as-built information for the vehicle frame to be repaired with the measured configuration of the damaged vehicle frame by allowing the technician to select the as-built frame information for the vehicle to be repaired, observe the vehicle's actual state as measured by the laser measurement system and determine the difference between the as-built and actual state of the frame, project the repairs necessary to return the car to the as-built state, and observe the car returning to that state by the manipulation of the frame by the repair technician.

Still another advantageous feature of the present invention is that the simulated model frame of the vehicle as-built is displayed for the technician in 3D on the monitor of the host computer so that the user can rotate, pan and zoom in space around the frame model, making it easy for the user to visualize the damage and the direction of the required repair.

In operation the laser measurement system initiates communication with a plurality of active targets or "smart" electro-optical detectors hung from reference points on the frame of the damaged vehicle and a "smart" laser scanner. As the targets are hung from the reference points their relationship to the reference points are automatically determined. In the event that the target is not auto assigned to a point, the end user can assign the location of any active target hung from a known reference point on the frame to the corresponding specification point on the as-built frame data, creating a relationship between the vehicle as-built measurements, and the observed measurements. This process is done by interaction with the 3D model. The active targets appear as 3D objects and can be manually manipulated within the rendering window. Each target is provided with a pop-up menu that shows it's XYZ absolute and delta position relative to the scanner, as well as the detected stem length from which the active targets are hung from the reference points on the frame.

Still another advantageous feature of the present invention is that the frame model can be colored on the display, depending on the delta of the targets position from the as-built position. This information can be reverse communicated to the active targets by placing them in "indicator mode" where colored lights on the targets can be set to the color of their measured damage, so the color of the active target on the display screen of the host computer is the same as it is glowing under the vehicle. This color updates as the active targets move during the repair process, so as the technician repairs the car, he can directly observe, in real-time, the positional status of a given target without looking at the computer display information.

In addition the measurement system can display three-dimensional vectors on the computer screen, which indicate the direction each target would need to move to return it to the as-built spec.

Upon completion of the repair process, or at some date after the repair process is completed, the laser measurement system of the present invention can prepare and provide a report of the repairs to an insurance company or to the customer for billing.

These and other objects advantages and features of the present invention are accomplished by a laser measurement system for indicating the difference between an actual configuration of a vehicle frame having a plurality of vehicle reference points and a normal position of the vehicle frame as defined by manufacturer-provided specification reference point values to determine the extent of deformation of the vehicle frame. According to one embodiment of the present invention the system comprises: a rotating laser scanner having an axis of rotation positioned at a scanner reference point, the scanner having a laser transmitter for generating a pair of substantially parallel, scanning laser beams separated by a known distance having a known speed of rotation and for broadcasting a synchronization pulse when the pair of substantially parallel laser beams begin a scan. A plurality of electro-optical detectors or active targets are provided for attachment to associated vehicle reference points. Each active target detects the synchronization pulse from the laser scanner at the start of a scan, the vertical position of the laser beams on the active target and the arrival time of the pair of scanning laser beams relative to one another as well as the synchronization pulse.

A target positioning means in the form of, for example, a target extension stem is provided for positioning each of the active targets within view of the scanning laser beams and the synchronization pulse emission of the laser scanner and at a known vertical distance from the associated reference point to which the individual active target is attached.

A host computer stores the normal positions of each of the reference points as defined by the manufacturer-provided specification reference point values and during the measurement process receives information from the active targets and laser scanner via, for example, an RF communication link. The host computer then calculates the actual position of the each of the vehicle reference points based on tilt data received from the scanner and the time stamped laser beam and vertical position detection data from the active targets associated with each of the vehicle reference points to be determined. The host computer compares the actual measured position of each of the vehicle reference points with the normal position thereof to determine a difference and displays this difference graphically using a color coded three-dimensional representation of the frame.

Thus, in operation, the host computer queries the scanner and each of the detectors via the communication link and in response the scanner provides the host computer with tilt information and each of the active targets provides the host computer with: a) the time stamps for the detection of each of the pair of scanning laser beams relative to one another and the synchronization pulse and b) the vertical positions of the each of the laser beams on that detector.

Once the information is received, the host computer calculates the z coordinates of each reference point based on the known vertical distance of the active detector from the associated reference point and the measured vertical position of the laser beams detected on that detector and the xy coordinates from: 1) the difference in the detection time of the laser beams at that detector in relation to the time of detection of the broadcast of the synchronization pulse to get the angular position of the target and 2) the speed that the laser beams traverse the target to determine the radial distance to the target.

The host computer compares the actual position of each of the reference points with its normal position stored in the storage means and displays the difference between the position of the each of the vehicle reference points on the vehicle frame and their normal positions.

DETAILED DESCRIPTION OF THE PREFERRED EMBODIMENT(S)

The Laser Measurement System

Figure 1:
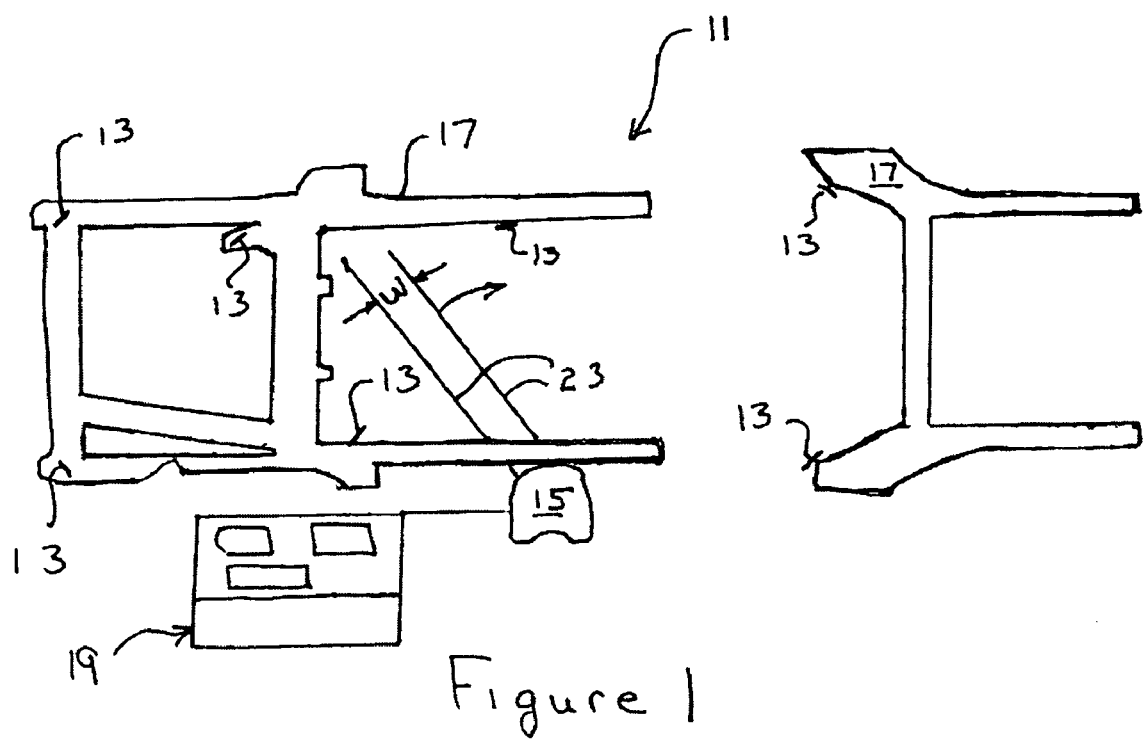
FIG. 1 is a schematic illustration of one embodiment of the laser measurement system of the present invention used for repairing a vehicle frame.

Referring to FIG. 1, one embodiment of a laser measurement system, generally indicated at 11, is shown in accordance with the teaching of the present invention for use, for example, in automotive collision repairs of a vehicle frame 17. The system 11 comprises three primary elements: a rotating laser transmitter/scanner 15, a plurality of electronic optical detector elements or active targets 13 that are attached to frame 17 and detect optical emissions from the laser scanner to develop position information for the frame 17 to be repaired and a host computer, generally shown at 19, with software to display and compare position data received from the active targets 13 with stored reference data delineating the optimal or "as-built" configuration of the frame 17 so as to display a simulated model of the frame of the vehicle showing the difference between as-built configuration and the actual configuration of the vehicle frame in three dimensions.

The rotating laser scanner 15 is positioned under the vehicle so that the scanning laser beams sweep a full 360 degrees underneath the frame 17 to be repaired. The axis of rotation r of scanner 15 and angular position of the scanner 15 relative to the frame are determined by the host computer 19 from the position data received from scanning the active targets 13 and used as the reference point and angle from which the relative position of the targets 13 are determined. As will be more fully discussed with particular reference to FIG. 2, the laser scanner 15 emits: 1) a pair of parallel scanning laser beams 23, separated by a known distance w, rotating about the axis of rotation r of the scanner 15 and 2) a synchronization pulse for detection by the active targets 13, the synchronization pulse being broadcasted by the scanner when the pair of substantially parallel laser beams are at the beginning of a sweep.

Figure 4:
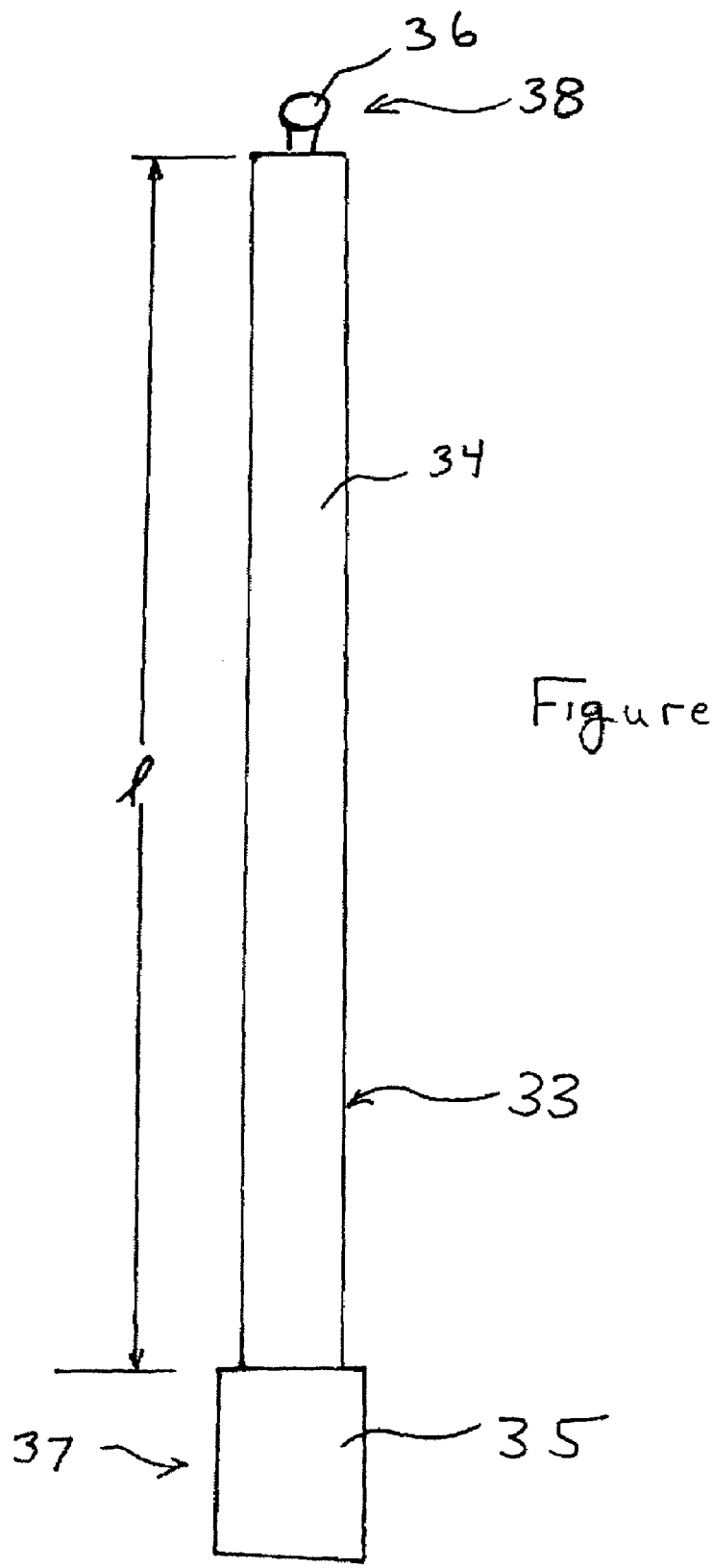
FIG. 4 is a side planar view of the target extension stem from which an active target is hung plumb under the influence of gravity from a reference point on the frame being repaired.

The active targets 13 are hung plumb under the influence of gravity from known locations or reference points on the frame 17 by stems 33 (as best seen in FIG. 4) having a known length sufficient to position each of the active targets 13 below the frame 17 and within view of the scanner 15. The active targets 13 are oriented so that they are facing the scanner 15 for detection of both the synchronization pulse as well as the pair of laser beams 23 as the laser beams 23 sweeps across the face of each of the active targets 13. The laser scanner 15 and each of the active targets 13 are linked to the computer 19 via, for example, an addressable full duplex RF communication link.

In operation, as the laser scanner 15 rotates the parallel laser beams 23 pass a synchronization point which determines a known reference angle (for example, an angle of 0 degrees at the beginning of a 360 degree sweep) of the laser beams 23, the synchronization pulse is issued by the scanner 15 and sensed by the active targets 13 which each have a full duplex RF communication link 24b for communicating with the host computer 19. The active targets 13 detect the broadcast of the synchronization pulse and a synchronization time stamp is issued. When the laser beams 23 sweep across the face of the active target 13, the time of detection of the lasers beams relative to one another and the synchronization pulse are detected and time-stamped. The scanner 15 also includes a communication link 3, such as a full duplex RF communication link for communicating tilt information to the host computer 19 which is used by the host computer program to compensate for any differences in tilt between the laser scanner 15 sitting on the floor underneath the vehicle and the plumb hanging active targets 13.

The host computer 19 queries the scanner 15 and each of the active targets 13 and the targets 13 transmit the time stamp information and the vertical position of detection of the beams 23 back to the host computer 19 which computes the polar coordinates and height of each target which is then converted by the host computer software to their corresponding xyz locations in three-dimensional space as will be more fully described hereinafter. It should be noted that each of the active targets 13 include a CPU 24 which is used to process and store the date stamp and position detection data for transmittal to the host computer 19.

The Laser Scanner

Figure 2:
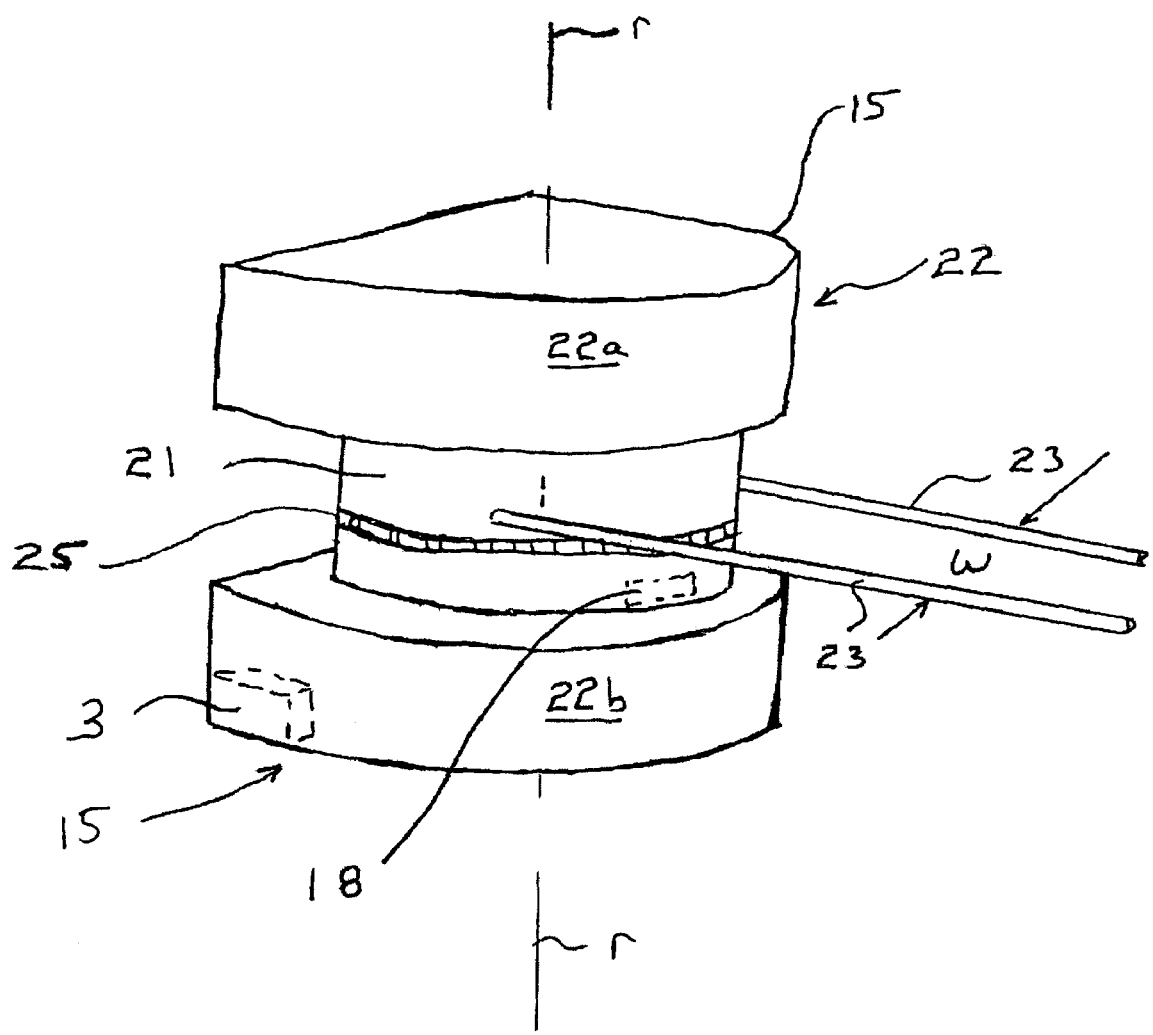
FIG. 2 is a perspective view of the laser scanner of the present invention.

Referring to FIG. 2, the rotating laser transmitter/scanner 15 comprises, for example, a single rotating hub 21 from two substantially parallel laser beams 23 are emitted perpendicular to the axis of rotation r which forms the reference point location of the scanner 15. This reference point r is determined by the host computer software from the position data received from the active targets 13. The scanner 15 has a housing, generally indicated at 22, that comprises top and bottom portions 22a, 22b respectively shaped to permit the orientation of the scanner 15 either on its side or its base (as shown in FIG. 2) so that the scanning laser beam can be emitted in a substantially horizontal plane (as shown) or a substantially vertical plane, i.e., on the flat portion of the scanner seen on the left side of the drawing. With the laser scanner 15 in the vertical position the laser measurement system 11 can also measure the side of the vehicle and upper body points.

As previously noted, the rotating laser scanner 15 also has a tilt sensor 18 which indicates the deviation of the plane of rotation of the laser beams 23 from the horizontal. This feature is important because the measurement of the laser beams 23 at the active targets 13 (which are all adapted to hang plumb under the influence of gravity) requires compensation for any tilt of the scanner 19 since this out of square condition effects the calculation of the radial distance of the active targets 13 from the scanner reference point r. This also allows the out of level condition of the vehicle to be calculated and compensated for. Moreover, the active targets 13 do not have to have a tilt sensor. With just the tilt sensor 18 in the laser scanner 15 the system 11 can compute the tilt of the laser and the tilt of the vehicle.

The parallel scanning laser beams 23 are generated by a pair of parallel lasers units or a single laser unit mounted on a rotating platform. The rotating hub 21 includes, for example, periscope-style correction of laser pitch and yaw when the pair of beams 23 are generated from a single laser unit, and split with a beam dividing prism into the two parallel beams. By splitting one beam into two halves, instead of using two laser beam generators, discrepancy in the error from one of the parallel beams 23 as compared to the other of the parallel beams 23 is easily eliminated; because only the one source beam has error, each of the beams 23 carries the same error, which is accounted for in software.

The rotation of the laser beams 23 defines a 360-degree, roughly planer surface, which can be either vertical or horizontal depending on the orientation of the rotating hub 21. The light of the laser beams 23 are either in the visible or the non-visible wavelengths. In addition to the parallel laser beams 23, an array of lights, for example, IR LED's 25, surround the circumference of the rotating hub 21. These LED's are activated as the hub rotation passes a certain point (to provide a known reference angle) thus creating the synchronization pulse. This synchronization pulse is broadcast simultaneously in substantially all directions and substantially in the same plane as the parallel laser beams 23.

As noted above, the scanner 15, for example, in the rotating hub 21, includes a tilt sensor 18 for planar orientation correction, which is effective in both horizontal and vertical operation modes, and allows auto-detection of which mode is likely desired by the user. The hub's rotation is controlled by a very stable phase lock loop RPM feedback system which measure the instantaneous speed of rotation (RPM's) of the scanner 15. Communication with the rotating laser scanner 15 is accomplished, for example, through an addressable full duplex communication link (for example a RF link) to the host computer 19. That communication includes tilt sensor information (pitch and roll), laser RPM, and laser status (on/off). The rotating laser scanner 15 communicates to the computer 19, via the full duplex communication link, the various calibration information such as beam spacing, beam parallelism and cone error. These items are known from a calibration procedure done during the assembly of the scanner 15, and stored in an EEPROM inside the scanner's circuitry. They are not updated live. The system 11 also includes a temperature sensor for $1^{st}$ order correction of thermal effects upon beam and hub stability.

The Active Targets

Figure 3:
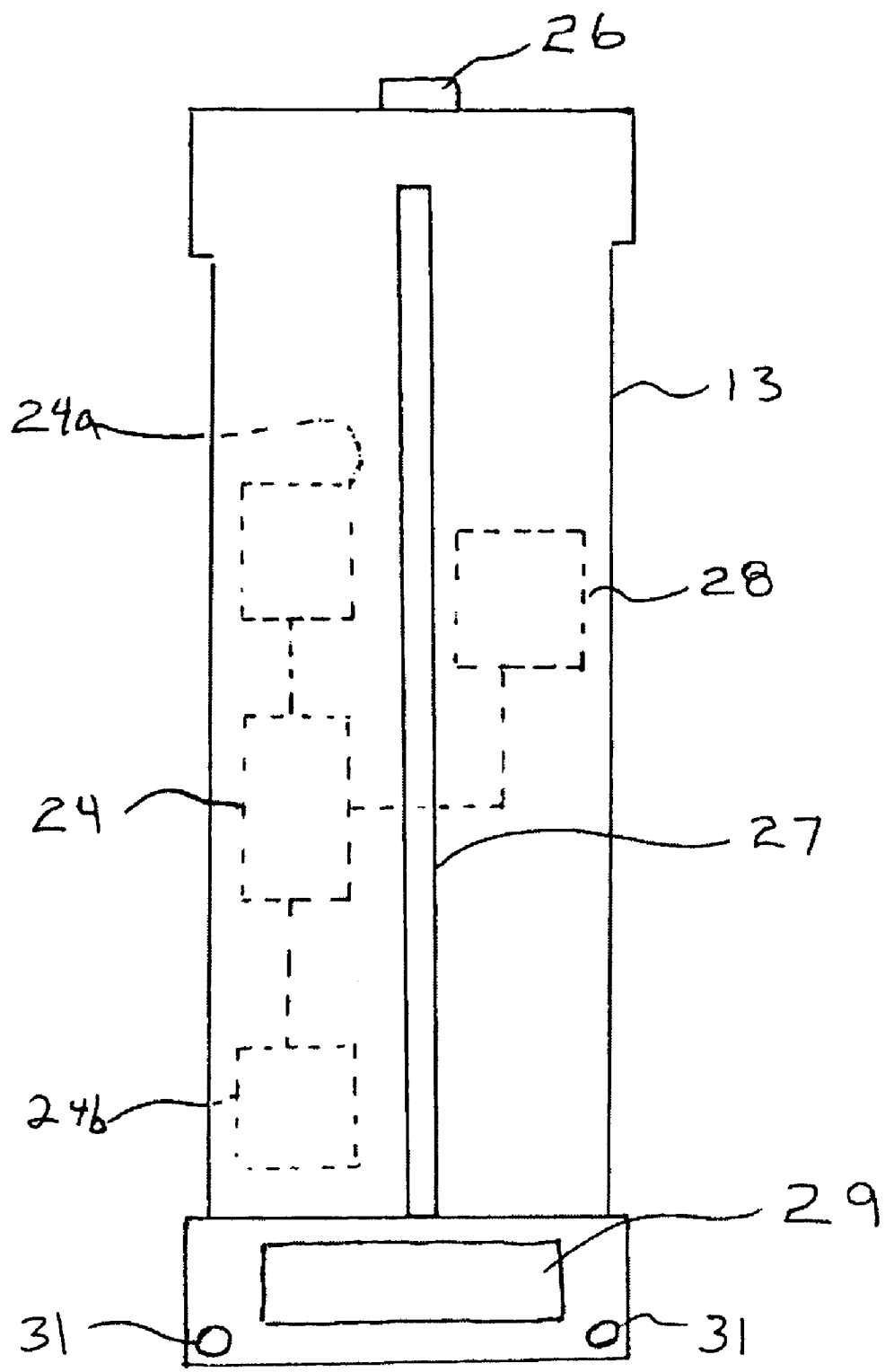
FIG. 3 is a front planar view of the active target of the present invention.

Referring to FIG. 3, one embodiment of the active target 13 is illustrated that uses opto-electronics, including a CPU 24 having a data storage device 24a for storing data received by or detected by the active target 13. The active target 13 also includes a communication link 24b by which the CPU 24 communicate with the host computer 19. The active target 13 employs the opto-electronics and communication link to detect and report the nature of the light signals emitted (synchronization pulses and scanning laser beams) by the rotating laser scanner 15. The active target 13 of the embodiment of FIG. 3 has two light detection elements.

The first detection element is a height and position photo-detector cell 27 for detecting the arrival times and vertical position of the laser beams on the cell 27 as they sweep across the face of the target 13. The cell 27 is preferably relatively long and narrow. Detection is accomplished by time stamping the detection of the leading and trail edges of the each of the laser beams 23 as they traverse the narrow width of the cell 27 and using the on-board CPU to calculate the average to find the point at the center of the lateral width of the cell 27 at which the laser beams 23 are detected. This center point of detection on the cell 27 is used to calculate the radial distance of the target 13 from the scanner reference point r as well as the vertical distance z.

The second detection element of the active target 13 is a sync pulse detector 29 for detecting the sync pulse broadcast by the scanner. The detection of the sync pulse is time stamped and used as a reference time to determine the relative arrival times of the scanning beams 23 at the cell 27 to determine the xy coordinates of the center point of detection of the two laser beams 23 on the cell 27. The sync pulse detector 29 comprising, for example, a bi-cell photo-diode, that s a receiver that can detect the IR pulse generated by the laser scanner LED array 25. Because of the bi-cell structure of the sync pulse detector 29, it is also capable of determining the face angle of the active target tangent to the scanner's projected sync pulse.

The sync pulse starts a counter in the active target's CPU 24 that allows the target 13 to gather information for the host computer 19 to determine the target's position relative to the laser scanner reference position r, by comparing the arrival time of the sync pulse to the arrival times of the leading edge and trailing edge of each of the parallel laser beams 23 on the height and position detector cell 27 to calculate the average to find the point at the center of the lateral width of the cell 27 at which the laser beams 23 are detected.

Since the speed of rotation of the scanner 15 is known as well as the distance W between the parallel scanning laser beams 23, the radial distance d of the target 23 from the scanner reference position r is proportional to the time between detection of each of the beams 23 because the beams 23 move faster through space the further away from the scanner reference point r the beams 23 are detected by detector 27. Moreover, since the speed of rotation is known as well as the time of detection of the beams 23 at the detector 13 relative to the time of broadcast of the synch pulse, the angular position of the detector 13 relative to the reference angle can be determined. Once the polar coordinates (distance d from axis of rotation r and angle difference from reference angle position of 0 degrees) of the target 13 is known those polar coordinated are converted into orthogonal coordinates (x,y coordinates) either by the host computer 19 or by the CPU 24 of the active target 13.

The cell 27 comprises a light detector, for example, a Position Sensing Detector (PSD). Alternatively, the cell 27 comprises, for example, scattering and fluorescent target bars, for example, a clear plastic bar with a light scattering surface and photodiodes mounted at each end. This forms a lossy light pipe that couples the scattered laser light to the attached photodiodes. The relative amplitude of the signals at each photodiode is used to determine the height of the beam strike on the cell.

To determine the height z of the strikes of the beams 23 on the detector 27, the PSD or lossy light pipe emits a current level proportionate to the vertical position of the laser beam 23 sweeping the active area of the laser scanner detector cell 27. More specifically, the PSD consists of three layers: P-layer at one surface, N-layer at the other surface, and I-layer between them, over a planar silicon substrate. Incident light falling on the PSD is converted photo-electrically and detected by the two electrodes on P-layer (P- and N-layers for duo-lateral types) as photocurrent. When a light spot falls on the PSD, an electric charge proportional to the light energy is generated at the incident position. This electric charge is driven through the resistive P-layer and collected by the electrodes. Since the resistivity of the P-layer is uniform, the photocurrent collected by an electrode is inversely proportional to the distance between the incident position and the electrode. It is possible to obtain the following formulas for the photocurrents I1 and I2 collected by the electrodes, where L and I0 respectively stand for the electrode inter-distance and the total photocurrent.

Thus, the relative amplitude of the signals at each of the electrodes is used to determine the height Z of the beam strike on the cell. This Z information, along with timing information (collected as each of the scanning laser beams 23 sweep leading and trailing edges across the detector cell) is stored in the CPU 24 of the active target 13 for analysis and communication to the host computer 19 which then can calculate the target's xyz position in accordance with the teaching of the present invention. This information is also fed to the same CPU 24 in the active target 13 as the output from the sync pulse detector, also allowing the active target 13 to calculate it's xyz position relative to the scanner 15.

As noted above the xy coordinates of an active target 13 can be calculated from the measurement of the time of detection of each of the parallel beams 23 at the height and position detector cell 27 relative to the broadcast of the synchronization pulse by determine the angular position and radial distance d of the active target 13 from the scanner reference position r.

Rotating Baseline Head

Alternatively, a triangulation technique can be used to determine the xy coordinates of a target 13 using two or more laser sources rigidly mounted on a baseline so that the entire assembly is rotated. In the following discussion a pair of laser sources and active targets will be assumed. Once per rotation a synch event is transmitted to all active targets by pulsing an array of near infrared LED located on the periphery of the scanner 15.

As the scanner 15 is rotated, each beam 23 crosses each height sensitive detector 27 at a different apparent angle from a common index event (broadcast of sync pulse). As in the dual scanning head approach, measuring the time from an index event (sync pulse) to a detection event and comparing this interval to the period between index events is typically used to measure the angle. This timing information is recorded by each active target 13 and transmitted to the Host Computer 19 via an RF datalink.

Again, prior to triangulating the height sensitive detector position 27, the angular measurements and locations of the lasers 23 and active targets must be corrected for deviations caused by the mechanical construction of the system 11. These corrections include: angular offset between the directions of the laser beams, nonsymmetrical location of the laser axis's from the center of rotation and non-perpendicularity of the laser beams to the axis of rotation r.

Some of the previously mentioned corrections can be minimized by mechanical adjustment of the various components of the system 11, such as laser position and orientation. Typically, a combination of mechanical adjustment, and software calibration based on testing with active targets at known positions is used to correct for these deviations. In addition each scanner has tilt sensors for measuring the pitch and roll of the scanner and this information is periodically interrogated by the system's host computer 19 via an RF data link.

For purposes of the following analysis it is assumed that the lasers are symmetrically located about the axis of rotation and that the beams are parallel. If this is not the case the angular data and effective laser locations and directions can be corrected by the previously mentioned calibration. In addition the rotation direction is assumed to be counter clockwise when observed from the +Z axis.

For each active target 13, the relative angular position of the rotating head for each beam strike is calculated from the synch interval and the time from synch to each strike on the height sensitive detector. This timing information is measured independently by each active target 13 and, when interrogated by the host computer 19, transmitted via an RF data link. Additionally each active target 13 computes the height of each beam strike on the height sensitive detector 27 and also reports these heights as well as target extension stem length when interrogated by the system PC.

Given the relative angles of the two beam strikes the XY location of the height sensitive detector can be calculated as follows.

Assume the lasers are separated by a distance W and that the lasers are pointed parallel to the +X axis at the angular index position.

The distance from the axis of rotation to the height sensitive detector is given by:

$$R = (W/2)/\sin((\theta2 - \theta1)/2)$$

Where:
theta1 is the angle for the first laser striking the detector
theta2 is the angle for the second laser striking the detector
R is the distance from the axis of rotation to the detector The X and Y coordinates of the height sensitive detector is calculated as follows:

$$X = R*\cos((\theta2 + \theta1)/2)$$

$$Y = R*\sin((\theta2 + \theta1)/2)$$

Having computed the XY positions of the height sensitive detectors on each active target and by reading the Z height, and target extension stem length from each target, the system PC can compute the XYZ location of each stem attachment point. These calculated positions can then be corrected for the pitch and roll of the scanner and pitch and roll error of the vehicle using the tilt sensor information transmitted from the scanner.

This scanner approach does require that the locations of the lasers relative to the axis of rotation and their relative pointing directions be stable with time and environmental conditions but the synch position can vary over time without causing errors in the relative location of targets. This is important because the fact that the sync position can vary over time means that there is no need to position the scanner 15 under the vehicle at a precise angular position to the vehicle frames, since the system 11 automatically compensates for any variations in the angular position of the scanner 15 relative to the frame to be repaired.

Having computed the XY positions of the height sensitive detectors 27 on each active target 13 and by reading the Z height, and target extension stem length (as described with particular reference to FIG. 4) from each active target 13, the host computer 19 computes the XYZ location of each stem attachment point. These calculated positions can then be corrected for the pitch and roll of the scanner 15 using the tilt sensor information transmitted from the scanner 15.

Two lights 31, for example, LED's, positioned at or near the bottom portion of the active targets 13 (for maximum visibility) are used to annunciate target position information. The lights 31 can communicate by way of blinks and specific colors the battery charge condition of the target 13, communication status and error codes. The CPU 24 inside the active target 13 generates the color information and control voltages. Additionally, these lights can be driven by a software package of the host computer 19 to display the computer's analyzed measurement results as a color-based signal that depicts the targets individual measured deviation (in real time) from the as-built database information. This information is delivered via the RF link, with the computer 19 sending the color code information to the active target 13. Thus, the system 11 reports visually to the end user how close each active target 13 is to its as-built location by color, red meaning far from "on-spec", to orange and yellow depicting reduced damage, to green, representing "on-spec" or in the correct position.

Each of the active targets 13 is suspended from a known reference point in the frame that forms the measurement point of interest by target extension stems 33 which can have different lengths in order to place the active target 13 in the plane of in view of the scanner 15. One advantageous feature of the target extension stem suspension of the active targets is that the arrangement is adapted to permit the active targets 13 to hang plumb under the influence of gravity. In this regard, vehicle frames 17 are typically provided with reference holes having a known location or known specification position, relative to other reference holes on the frame 17 so that deformation of the frame 17 can be measured by determining how far out of spec each of the reference holes.

A seen in FIG. 3, a bayonet connector 26 is provided at the top of each active target 13 to form the link between the target extension stem 33 and the active target 13. As will be described with particular reference to FIG. 4, the bayonet connection arrangement has a "smart" binary code built in, that provides stem length information to the active target CPU 24. In a further embodiment, there can be a dual-axis tilt sensor 28 in each active target 13, which communicates with the CPU 24 having data storage means 24a for storing data received for the detectors of the active target 13 or calculations made by the CPU 24 such as the currently detected xyz position of the target 13. The targets are, for example, battery powered with rechargeable cells. Communication with the active target 13 by the host computer 19 is accomplished, for example, through an addressable full duplex RF link to the host computer 19. This communication link carries various data (Target ID, Tilt (dual axis), Stem length, Battery Strength, X Y Z position data, Error Code Parameters, damage indicator color information from the software, etc) back and forth from each of the active targets 13 to the host computer 19.

The Target Extension Stem

Referring to FIG. 4, the target extension stem, generally seen at 33, for suspending the active targets 13 from the frame, is shown and comprises a metal rod 34 with an electrical bayonet connector 35 at its distal end 37 and a stem ball 36 at its proximal end 38. The bayonet connector 35 couples with the bayonet connector 36 of the active target 13 and has internal pins that are connected together in a manner that corresponds with the specific length I of the metal rod 43. Thus, when the active target 13 is attached by the bayonet connectors 26, 35 to the stem 33, the active target 13 identifies the length of rod 34 supporting the active target 13 from the specification point of measurement on the vehicle frame. There are, for example, seven different lengths of rod, which are organized by length and assigned a color code for ease of storage, and recognition within the software package. These seven lengths are optimized such that the active targets 13 can be hung so that the laser sweep strikes the active detector cell elements on the active targets 13.

Frame Attachment Connector

Figure 5:
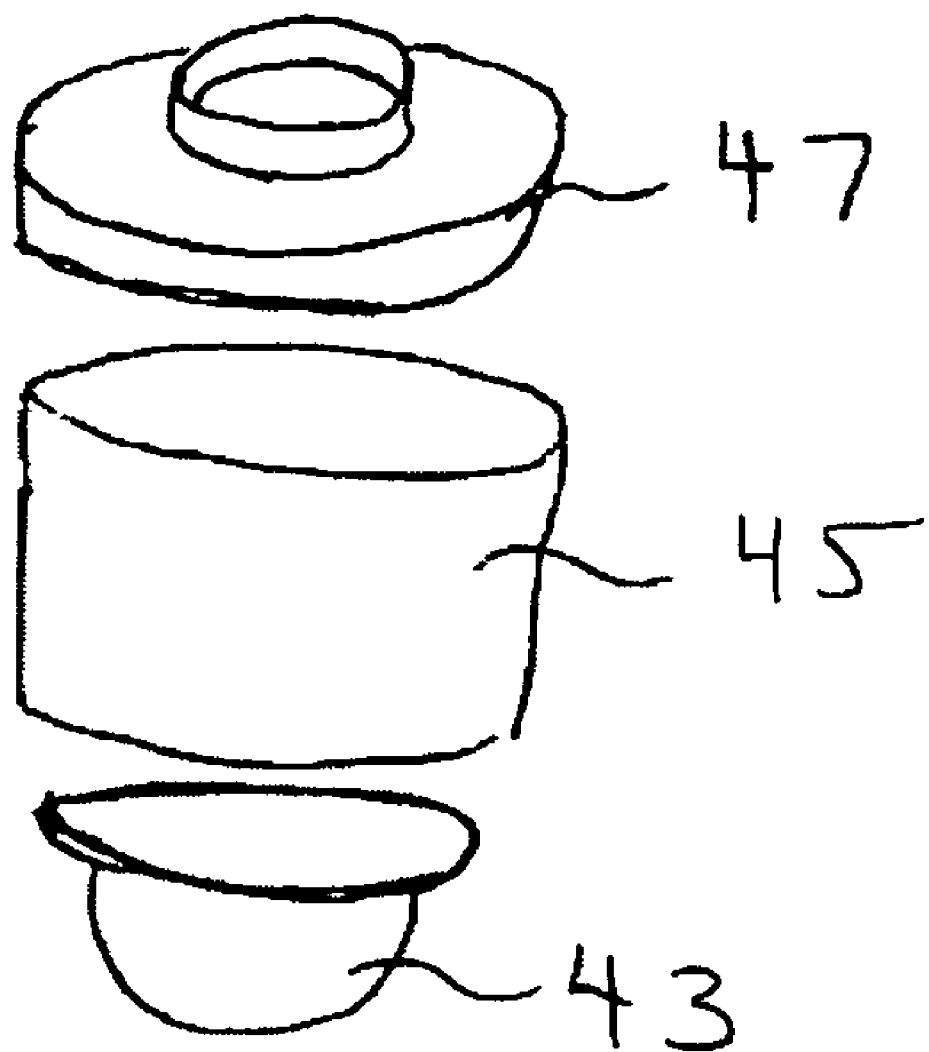
FIG. 5 is an exploded perspective view of the magnetic coupling used to attached the target extension stem to the vehicle frame.

Referring to FIG. 5, the attachment, generally indicated at 41, for attaching the stem 33 to the reference mounting point on the vehicle frame, is shown. The attachment 41 is a mechanical coupler between the target extension stem 33, and the mounting points on the frame. The embodiment of the attachment 41 shown in FIG. 5 comprises, for example, three components: a plastic friction grip connector 43 at one end, to receive the stem ball connector 36 and let it pivot freely so that the active target 13 hangs plumb to gravity; a powerful magnet 45 to couple the ball grip 43 to the vehicle frame; and a set of bolt/hole adapters 47 which provide a centering function, and a magnetic interface function. Gauss (magnetic force) is exponentially proportional to proximity; so the attachment 41 uses interchangeable bolt/hole adapters 47 to maximize surface contact with the metallic connection point, improving magnetic grip, as well as insuring proper centering for the various bolt and hole diameters present in auto body frames. This centering ability, coupled with a known length I from the face of the adapter to the center of the ball mount, allows the computer system to correctly relate the xyz information provided by the opto-electrical active targets 13 to the actual position of the mounting points on the frame.

Frame Repair Software

The host computer 19 of the present invention employs frame repair software that provides a quality user interface, mathematical analysis and information display to automotive frame repair software. The software is divided into three screens, one for data entry, one for the measurement and repair of auto body frame damage, and one for the reporting of the results of the repairs, or reporting the current state of damage for a frame.

A. Data Entry

The data entry arrangement for the frame repair software utilizes a screen with a body of fields for entering and editing the information regarding a given frame repair. Fields are included for customer data, automobile data, insurance company data, and repair technician data. The contents of these fields are saved into a database of repair information that stores all of the information regarding each individual measurement and repair done by a given workstation for a given customer. The data is stored in such a format that it can be transferred to other workstations, and archived for later retrieval. The data is also accessible by the other screens for uses appropriate to each screen.

B. Measurement

The frame repair software compares the undamaged or as-built information for the vehicle frame to be repaired with the measured configuration of the damaged vehicle frame. The frame repair software allows the technician to select the as-built frame information for the vehicle to be repaired, observe the vehicle's actual state as measured by the laser measurement 11, determine the difference between the as-built and actual state of the frame, project the repairs necessary to return the car to the as-built state, and observe the car returning to that state by the manipulation of the frame by the repair technician.

I. Selection of as-Built Data.

The frame repair software presents the end user with a choice of makes, then years, then models and trim levels for a vehicle to quickly narrow down the as-built frame information to the exact vehicle the technician is working on. Once the correct as-built frame information is determined for the make, model and year of the vehicle being repaired is determined, the frame repair software reads the as-built data into the systems 3D best-fit analysis engine. A simulated model frame of the vehicle as-built is displayed by the program in 3D, so that the user can rotate, pan and zoom in space around the frame model, making it easy for the user to understand the relationship between the digital mockup and the real vehicle.

II. Observation of Frame Data

The frame repair software of the system 11 initiates communication with the active targets 13 and the scanner 15, polling them for data as they become active. The end user assigns the location of each active target 13 hung from a known reference point on the frame to the corresponding specification point on the as-built frame data, creating a relationship between the vehicle as-built measurements, and the observed measurements. This process is done by interaction with the 3D model; wherein the active targets 13 appear as 3D objects and can be manually manipulated within the rendering window. Each target 13 has a pop-up menu that shows it's XYZ absolute and delta position relative to the scanner 15, as well as the detected stem length.

III. Analysis of Comparison

Once the user installs a minimum of 3 active targets within view of the scanner 15 and assigns them to specpoints on the frame 17, the host computer 19 can begin a best-fit analysis of those targets actual position relative to the as-built data. The scanner 15 is capable of measuring the distance and position of the active targets 13 relative to the scanner's position, which is a known location within the local coordinate map. However, the position of the spec points is generated from the measured data, i.e., stem length, active target position, tilt, etc. Therefore, the software must match to two disparate coordinate maps together, to insure 1) that the measured location of targets that are within a threshold of proximity to the spec point listed are marked as on-spec, and 2) that the measured location of targets that are outside of that threshold of proximity are assigned error to depict the direction and severity of their displacement. Best fit is a least-squares mathematical model, which iteratively solves for the most likely location of the targets by resolving a sum of the least squares analysis of the two disparate coordinate maps of XYZ positional data. It is this mathematical solution that allows damage to be properly assigned to reference locations that are out of spec.

Some vehicles have frame portions that are not built to as stringent a standard as the under-hood frame, most notably truck beds. The laser measurement system 11 allows each target to be included or excluded from the best-fit calculation, giving the technician the ability to fine tune his measurement, so that he can understand what areas are truly damaged. This model insures that the damage observed is correctly applied to the damaged sections of the vehicle. This information gives the end user a confident analysis about where and how severely the frame is damaged.

Once the best-fit engine is enabled, each active target 13 can display its current location in numeric XYZ format, as well as Delta from spec XYZ values. Additionally, the frame model can be colored, depending on the delta of the targets position from the as-built position. In this mode, the frame 17 is colored in a smooth gradient depicting damage, from red for the target locations indicating the most damages, to green for active target locations within the damage threshold. This threshold can be manually adjusted to amplify small levels of damage to a visible level or scale large levels of damage to fit the screen area. This information can be reverse communicated to the active targets 13, by placing them in "indicator mode" their colored led light pipes 31 can be set to the color of their measured damage, so the color of the active target on screen is the same as it is glowing under the vehicle. This color updates as the active targets 13 move during the repair process, so as the technician repairs the car, he can observe, in real-time, the positional status of a given target.

In addition, the engine can display vectors on the computer screen, which indicate the direction each target would need to move to return it to the as-built spec. The magnitude of this vector arrows are also manually adjustable, so that the user can exaggerate the arrows to better understand the orientation of the vectors, or minimize them to show only the most severely damaged points.

IV. Observation of Repair Process

Given this body of information, the repair technician is now free to use whatever method he has at his disposal to repair the damaged frame elements depicted by the laser measure system's frame repair software. Several features in the software further enable and facilitate this repair.

As the technician proceeds through the repair process, he may find it useful to "undo" or backup the view to a previous position, allowing him to compare previous states of the frame to current state. The "snapshot" interface allows at any point the technician to save a snapshot of the current position of all of the targets, as well as the view of the 3D rendering screen. This tool allows the technician to observe the frame before and after his repair efforts and gives him a powerful tool for learning the particular challenges of an individual repair.

In addition to the standard 3D view, an alternative method for observing a targets precise location, called Bullseye mode, allows the technician to focus on a single active target 13. In this mode, the target 13 is depicted on the computer screen as a dot, glowing the color relative to its damage, which is placed on a crosshair display with concentric circles depicting demarcations in the distance of the target 13 to the center. The center is where the as-built data reports the target 13 is supposed to be. There is a colored ring that shows Z position error, which gets larger as the target gets further from vertically aligned, and closes in on the center as it becomes correct, with the color code red for high, and blue for low. This system is real-time updated, so as the technician pulls on the car he can see exactly which direction and how much he needs to pull on the frame so that the target will line up right on the Bullseye.

Another useful feature is the indicator mode, which colors the communication LED light pipes 31 on the targets 13 corresponding to their relative damage as depicted in the frame repair software. This color is updated real-time, so as the technician pulls on the vehicle frame he will be able to watch the targets 13 turn from red to orange to yellow to green as they approach the correct as-built spec position. This frees the technician from the computer workstation, so the frame repair can be done with fewer trips back and forth.

There are two indicators that help the technician ensure that he has fully repaired the vehicle. One shows that neither of the manual adjustments (the vector scaler and the damage scaler sliders which adjust the view intensity) have been used to eliminate the display of damage when damage still exists, and another shows that all of the targets in the field are included in the best-fit analysis. This ensures that the technician has fully repaired the car, and that the manipulatable interface of the frame repair software hasn't obscured some important damage information without the technician's knowledge.

C. Report

Upon completion of the repair process, or at some date after the repair process was completed, the technician will have a need to report the repair to an insurance company or to the customer for billing. The frame repair software of the laser measurement system 11 has a robust reporting system, which includes the ability to include any or all of the following: information collected in the data entry screen, snapshot views from the measurement screen, as well as zoom in shots on damaged areas of the frame, annotations by the technician on any of the photos, as well as numerical comparisons of before and after XYZ positional information for the most damaged spec points in the repair. This system gives the technician maximum control over what data goes to the insurance companies.

Additionally, the report system can be used without having actually repaired the frame damaged measured, as an estimating device, or as a way to show a customer the extent of the damage present in a given frame. This level of control over the report system gives the repair technician maximum flexibility to use the tool how he wants.

The laser measure system 11 of the present invention utilizes a comprehensive frame repair software suite, with the ability to control and observe the operation of the laser measurement system in real-time. Together these tools represent the state of the art in automotive frame repair measurement systems.

Although the present invention has been described in terms of specific exemplary embodiments, it will be appreciated that various modifications and alterations might be made by those skilled in the art without departing from the spirit and scope of the invention as specified in the following claims.

What is claimed is:

1. A vehicle frame measurement system for determining the difference between the actual three-dimensional configuration of a vehicle frame requiring repair and the normal three-dimensional configuration of the vehicle frame as defined by the manufacturer to determine the extent of deformation of the vehicle frame and the necessary repairs required to the vehicle frame, the system comprising:

a rotating laser scanner having a pair of substantially parallel laser beams separated by a known distance and rotating in unison at a known speed of rotation around an axis of rotation and synchronization pulse light emitters for broadcasting a synchronization pulse when the pair of substantially parallel laser beams are at a known reference angle;

a plurality of active targets each for attachment to the vehicle frame at a give reference point having a corresponding normal reference point value as defined by the manufacturer, each active target detecting position data comprising the synchronization pulse, the time of detection of the laser beams relative to one another and the synchronization pulse, a vertical position of the laser beams on the active target and including storage means storing the position data;

positioning means for positioning each active target within view of the scanning laser beams and the synchronization pulse emitted by the laser scanner and at a known vertical distance from the associated reference point which is communicated to the associated active target and stored by the storage means with the position data;

a host computer for receiving position data from the active targets to determine an actual position of each reference point relative to a normal position of the reference point as determined by the manufacturer's specifications and for displaying the frame and the differences between the actual and the normal positions of the reference points of the frame to illustrate the degree of deformation of the actual configuration of the frame and to visually indicate the repairs needed to restore the frame to its normal configuration; and a communication link by which the host computer at least receives position information from the plurality of active targets communicate with one another.

2. A vehicle frame measurement system according to claim 1, wherein the host computer further includes means for preparing a report including the repairs needed to the frame.

3. A vehicle frame measurement system according to claim 2, wherein the system further includes means for providing the report to recipients including an insurance company.

4. A vehicle frame measurement system according to claim 1, wherein each of the active targets include indicators which indicate the degree of difference between the actual position of the vehicle reference point to which the active target is attached and the normal position thereof as defined by manufacturer.

5. A vehicle frame measurement system according to claim 4, wherein the indicators on the active targets also indicate which direction the vehicle reference point needs to be moved in order to occupy it's normal position.

6. A vehicle frame measurement system according to claim 1, wherein each active target transmits to the host computer position data that includes: 1) the known vertical distance received from the positioning means and the vertical positions of each of the laser beams detected on that detector, 2) the vertical position of detection of the laser beams on the active target, and 3) the difference in the average time of detection of the laser beams at the active target in relation to one another and the time of detection of the broadcast of the synchronization pulse.

7. A vehicle frame measurement system according to claim 6, wherein, using the speed of rotation and distance of separation of the scanning laser beams and the position data from the active targets, the host computer computes the radial position and distance to the center point of detection of each of the active targets from the axis of rotation of the scanner and the vertical positions of the active targets below their corresponding reference points to calculate the actual position of each reference point on the frame in relation to the normal position and display the difference.

8. A vehicle measurement system according to claim 7, wherein the laser scanner has a tilt sensor, the output of which are communicated to the host computer which include means for compensating for the difference in tilt between the laser scanner and the vehicle frame when calculating the position of the vehicle reference point relative to the scanner reference position.

9. A vehicle measurement system according to claim 1, wherein each active target includes detection means comprising a height and position photo-detector cell for detecting the arrival of and vertical position of the laser beams at the detector target and a synchronization pulse detector for detecting the synchronization pulse.

10. A vehicle measurement system according to claim 9, wherein the synchronization pulse detector is a bi-cell photodiode.

11. A laser measurement system for indicating the differences between an actual position of a vehicle frame reference points on a vehicle frame and normal positions thereof, the system comprising:

a rotating laser scanner having an axis of rotation positioned at a scanner reference point, the scanner having: 1) means for generating a pair of substantially parallel, scanning laser beams separated by a known distance and rotating at a constant speed of rotation around the scanner reference point and, 2) an array of light emitters for broadcasting a synchronization pulse when the pair of substantially parallel laser beams are at a known reference angle;

active targets for attachment to vehicle frame reference points, each active target having: 1) detection means for detecting the synchronization pulse, an arrival of the laser beams at the detector and a vertical position of the laser beams on the detector, 2) processing and storage means for time stamping and for storing the detection times of the laser beams relative to one another and the synchronization pulse and the vertical position of the laser beams on the detector;

positioning means, having a known length, for attaching each active target at a known vertical distance from a reference point and for communicating the known vertical distance to the associated active target for storage;

a host computer, capable of communicating with at least the active targets, the host computer including: a) storage means for storing the normal positions of the reference points; b) calculating means for calculating the actual positions of each of the vehicle reference points based on data received from active targets; c) comparison means for comparing the actual positions of the each of the vehicle reference points with the normal positions thereof to determine a difference there between; d) display means for illustrating the difference between the actual position of each of the vehicle reference points on the vehicle frame and their normal positions, and a communication link by which the host computer communicates with each active target.

12. A laser measurement system according to claim 11, wherein the laser scanner communicates with the host computer via the communication link; and wherein the laser scanner includes a tilt sensor, the output of which are communicated to the host computer which include means for compensating for the difference in tilt between the laser scanner and the vehicle frame when calculating the position of the vehicle reference point relative to the scanner reference position.

13. A laser measurement system according to claim 11, wherein detection means of the active target comprise a height and position photo-detector cell for detecting the position of and arrival of the laser beams at the detector and a synchronization pulse detector for detecting the synchronization pulse.

14. A laser measurement system according to claim 13, wherein the synchronization pulse detector is a bi-cell photodiode.

15. A laser measurement system according to claim 13, wherein the height and position photo-detector cell is Position Sensing Detector.

16. A laser measurement system according to claim 13, wherein the active target further includes a connection means for connecting the active target to the positioning means.

17. A laser measurement system according to claim 16, wherein the connection means is adapted to permit the active target to hang plumb under the influence of gravity from the vehicle reference point.

18. A laser measurement system according to claim 16, wherein the positioning means include means for communicating the known vertical distance of the target from the reference point to the host computer.

19. A laser measurement system according to claim 16, wherein the positioning means includes means for communication the known vertical distance of the target from the reference point to the process and storage means of the active target for transmittal to the host computer.

20. A laser measurement system according to claim 11, wherein each of the active targets further include an indicator for indicating the degree of difference between the position of the associated vehicle reference point on the vehicle frame and the normal position.

* * * * *